United States Patent [19]
Webb

[11] Patent Number: 5,113,544
[45] Date of Patent: May 19, 1992

[54] PIPELINE PIG

[76] Inventor: Brian C. Webb, 9814 E. 28th Street, Tulsa, Okla. 74129

[21] Appl. No.: 477,602

[22] Filed: Feb. 8, 1990

[51] Int. Cl.⁵ ............................................. B08B 9/04
[52] U.S. Cl. .................... 15/104.061; 15/104.062; 166/170
[58] Field of Search ............ 15/3.5, 3.51, 104.061, 15/104, 062; 166/153, 170

[56] References Cited

U.S. PATENT DOCUMENTS

| | | | |
|---|---|---|---|
| 1,612,842 | 1/1927 | Thompson et al. | 15/104.18 |
| 2,246,421 | 6/1941 | Tate | 15/104.16 |
| 2,255,914 | 8/1940 | Crane | 15/104.061 |
| 2,794,197 | 6/1957 | Crane | 15/104.061 |
| 2,810,143 | 10/1957 | Reynolds | 166/170 |
| 3,074,436 | 10/1960 | En Dean | 137/802 |
| 3,088,491 | 5/1963 | En Dean | 15/104.061 X |
| 3,100,534 | 5/1960 | Herndon, Jr. et al. | 166/153 |
| 3,530,523 | 11/1968 | Ver Nooy | 15/104.061 |
| 3,649,983 | 3/1972 | Ver Nooy | 15/104.061 |
| 3,704,478 | 12/1972 | Vernooy | 15/104.061 |
| 3,778,859 | 12/1973 | Donnelly | 15/104.061 X |
| 3,879,790 | 4/1975 | Girard | 15/104.061 |
| 4,122,575 | 10/1978 | Sagawa | 15/104.061 |
| 4,178,649 | 12/1979 | Kouse et al. | 15/104.061 |
| 4,336,074 | 6/1982 | Dinkelacker | 134/8 |
| 4,406,030 | 9/1983 | Platts | 16/104.061 |
| 4,413,370 | 11/1983 | Payne et al. | 15/104.061 |
| 4,720,884 | 1/1988 | Ralls | 15/104.061 |
| 4,825,498 | 5/1989 | Rankin | 15/104.061 |

FOREIGN PATENT DOCUMENTS

| | | | |
|---|---|---|---|
| 0578129 | 10/1977 | U.S.S.R. | 15/104.061 |
| 0680771 | 8/1979 | U.S.S.R. | 15/104.061 |
| 1161200 | 6/1985 | U.S.S.R. | 15/104.061 |

*Primary Examiner*—William A. Cuchlinski, Jr.
*Assistant Examiner*—James K. Folker
*Attorney, Agent, or Firm*—Laney, Dougherty, Hessin & Beavers

[57] ABSTRACT

A pig which may be propelled by fluid flow through a pipeline includes a cupped or hollow spherical head having an inside and an outside. The head has an opening for facing upstream and receiving fluid flow in the pipeline and has an outside for facing downstream and for contacting the inside walls of the pipeline. An elongate tail has a first end connected to the inside of the head and a second end extending out of the opening. The tail is of smaller diameter than the opening and has a length greater than about 1.5 times the largest internal diameter of the pipeline. A first fastener is provided on the outside of the head and a second fastener is provided on the second end of the tail. The fasteners are used to connect multiple pigs end-to-end and to attach objects, such as pipeline cleaning and maintenance equipment, to the pig.

14 Claims, 3 Drawing Sheets

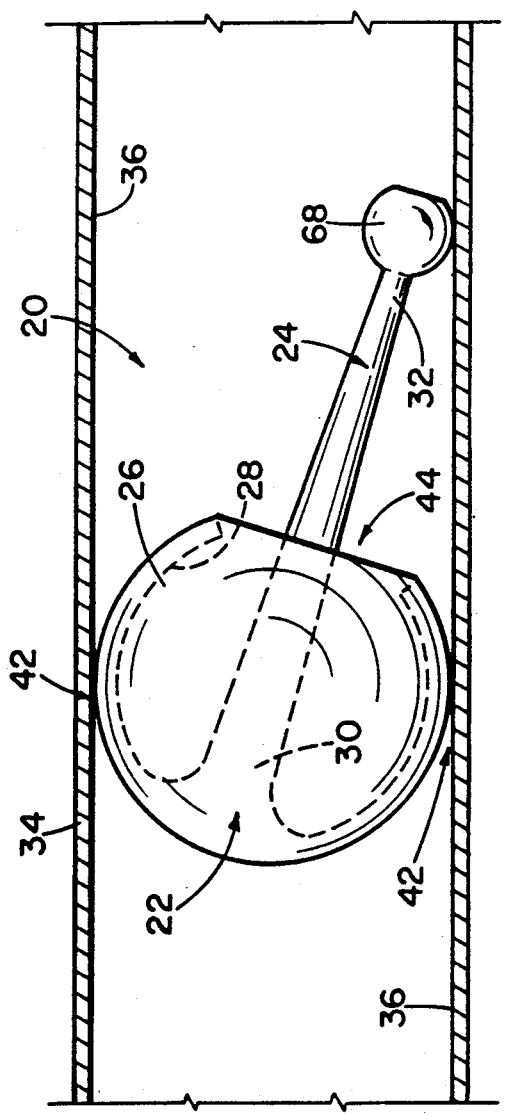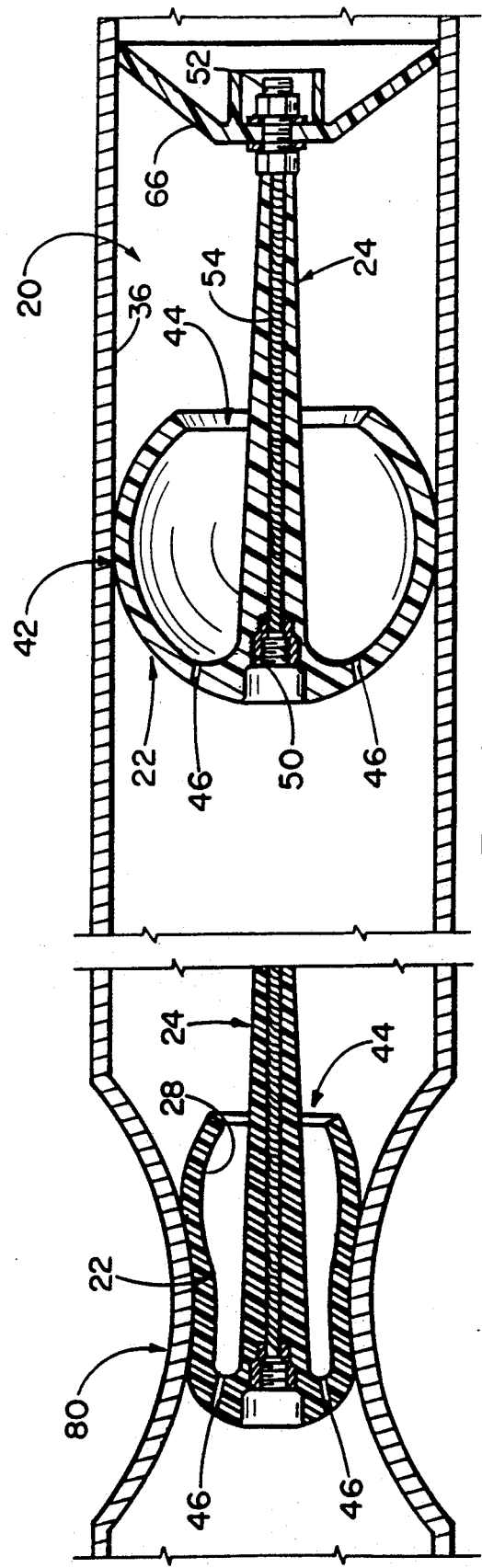

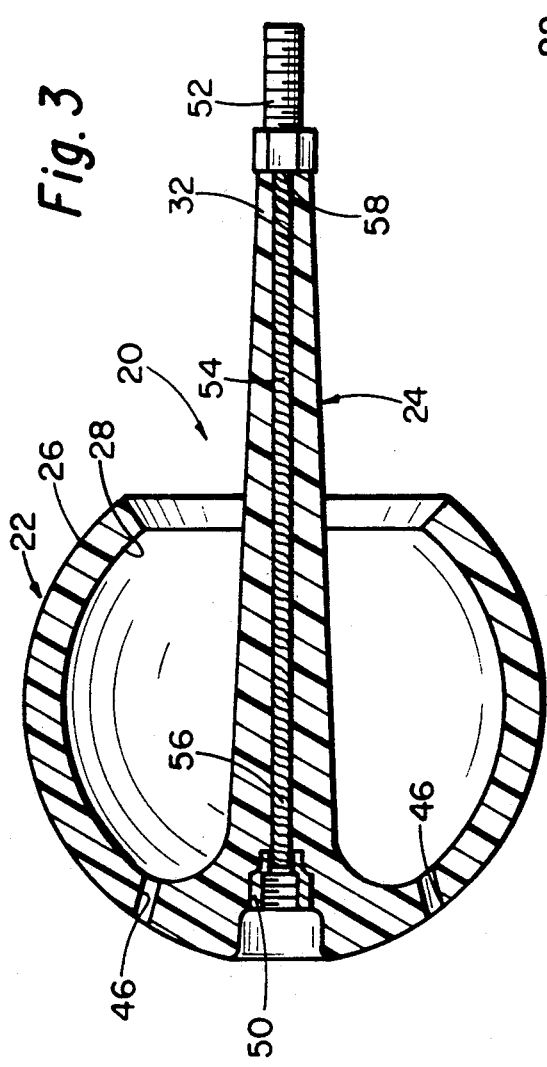
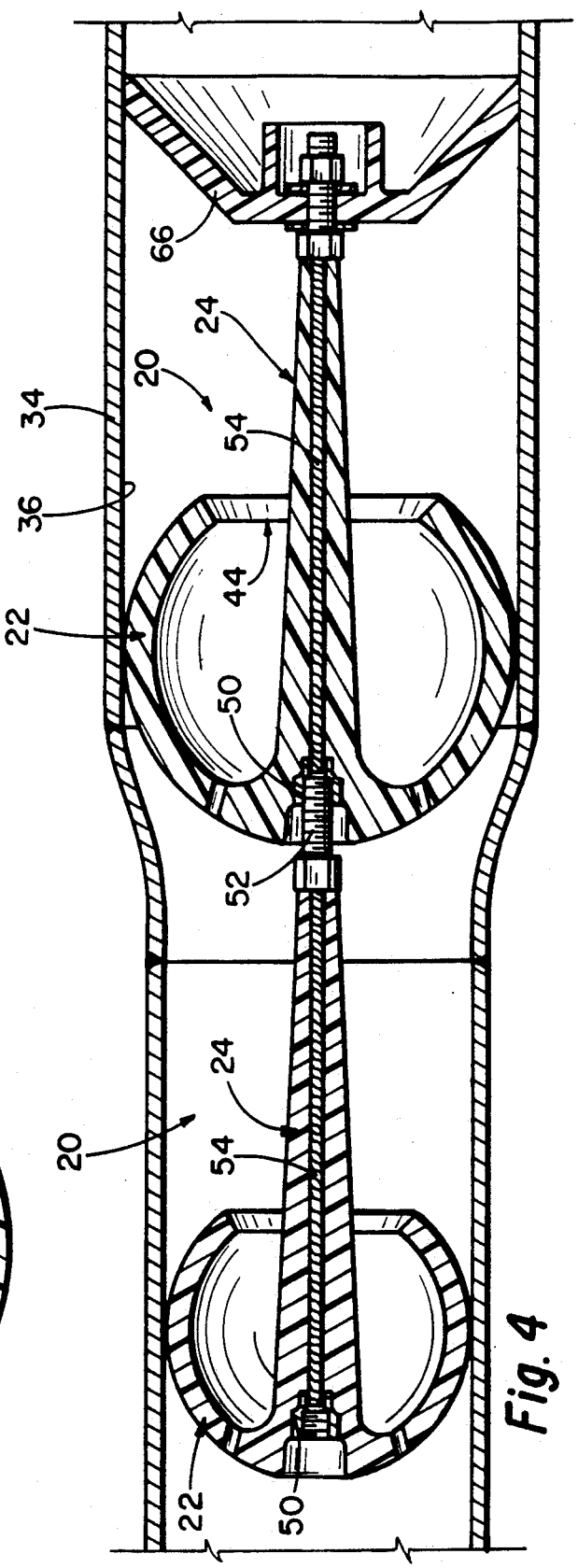

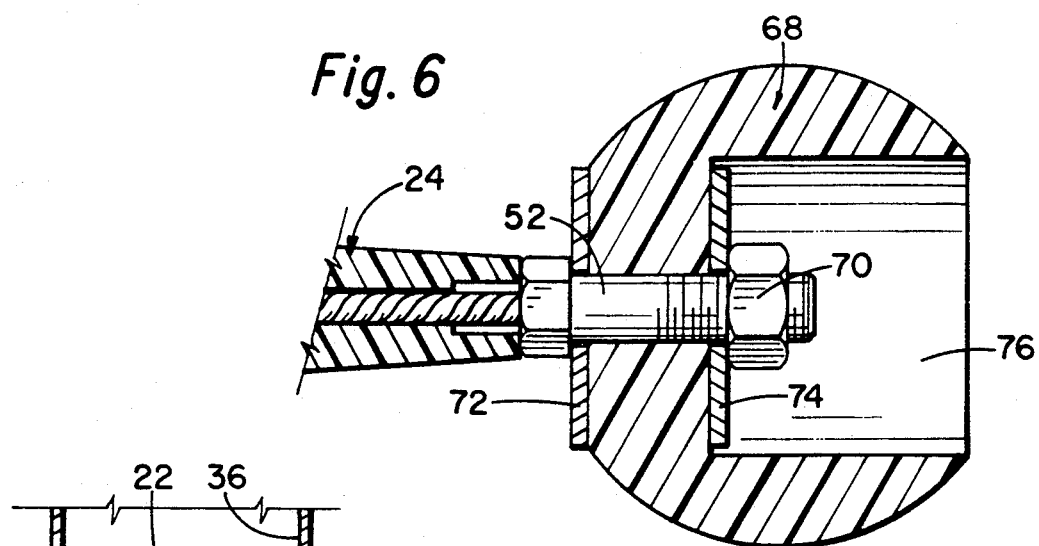
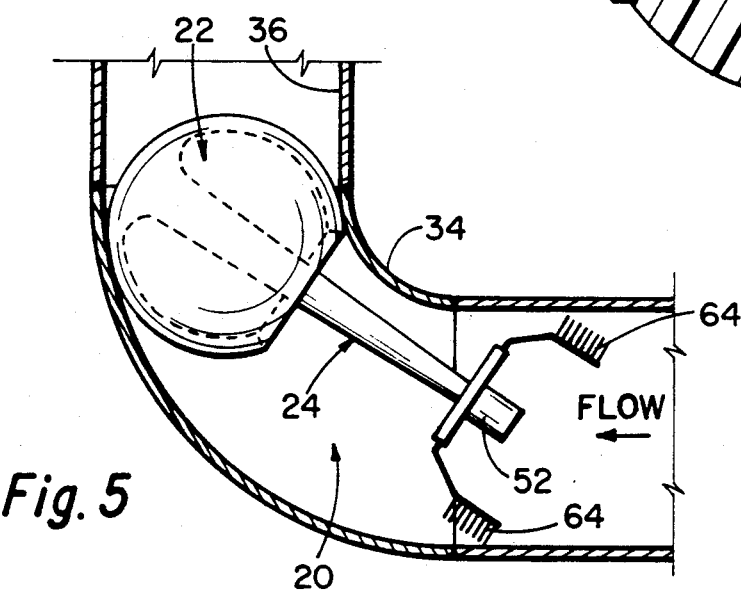
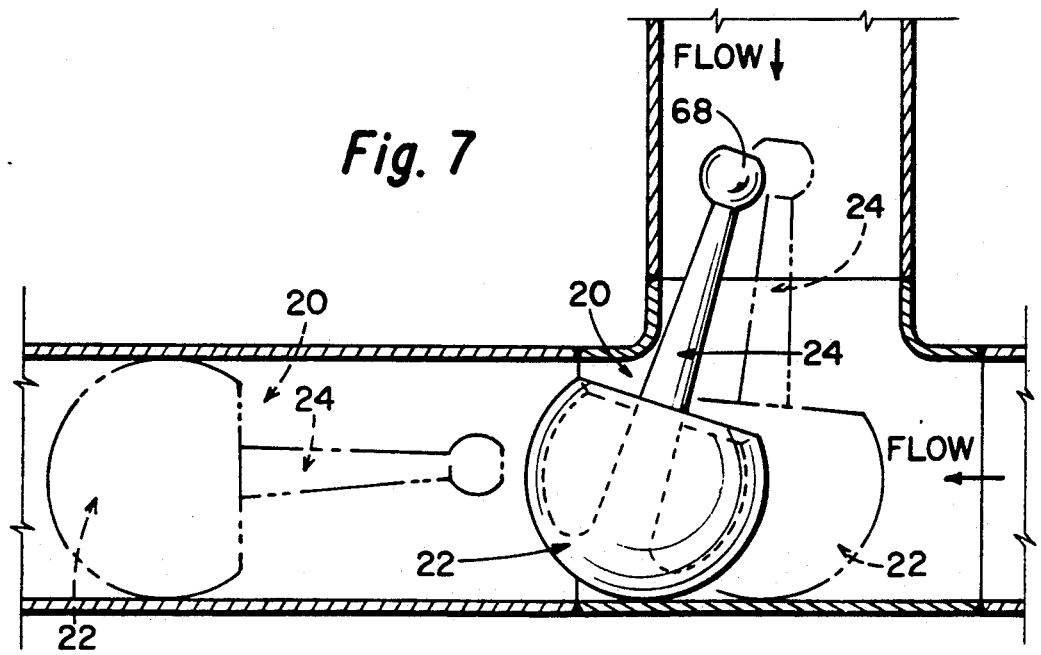

PIPELINE PIG

BACKGROUND OF THE INVENTION

This invention relates to devices for cleaning pipelines and more particularly to pipeline pigs used for internal cleaning, corrosion control, and fluid separation in pipelines.

Pipeline pigs are used to accomplish various operations inside in-place pipeline systems, such as removing wax, dirt, and water accumulation from pipelines; separating products to reduce the amount of interface in the transition zone between different types of fluids flowing in pipelines; controlling liquids inside a pipeline, e.g., reducing liquid accumulations in two-phase flow pipelines, filling pipelines for hydrostatic tests, dewatering pipe-lines following hydrostatic tests, drying operations, and purging hydrostatic test water with petroleum liquid; inspecting pipelines and detecting dents, buckles, or excessive corrosion; and applying internal coatings to the walls of pipelines for corrosion protection.

Traditionally, spheres, metal-bodied pigs plastic-bodied pigs, and foam pigs have been used to accomplish the above listed operations. The effective use of each of these prior pigs is usually limited to specific applications. There has been little overlap in the effective use of the prior pigs. As a result, no single pipeline pig is known which will accommodate and fulfill the various needs and uses for pipeline pigs.

Problems also arise in the use of the known pipeline pigs. For example, if the pipeline has any 90° bends or elbows a special pig, such as a sphere or foam pig, has traditionally been used. In some circumstances, these pigs do not clean or scrape the inside of the pipeline as well as steel-bodied pigs. If the bend is made using a screwed 90° fitting a foam pig cannot be used, as such screwed fittings will normally destroy a foam pig. Also, a foam pig often turns sideways as it passes through an elbow, which greatly reduces the effectiveness of the foam pig.

A similar problem arises if the pipeline has restrictions such as reduced port valves, venturi valves, plug valves, etc. In these cases, again, a foam pig must be used.

Therefore, there is a need for a universal pipeline pig which will adapt to most known pipeline configurations; which will pass through most types of 90° bends, elbows, and other pipe fittings; which will pass through check valves, venturi valves, plug valves, pipeline tees, etc.; and which will transport a variety of cleaning, maintenance, and information gathering equipment through a pipeline.

SUMMARY OF THE INVENTION

The present invention is contemplated to overcome the foregoing deficiencies and meet the above-described needs. For accomplishing this, the present invention provides a novel and improved pipeline pig.

The pipeline pig of the present invention includes a head having an outside and a cupped inside and an elongate tail having a first end connected to the cupped inside of the head and a second end extending out of the cupped inside of the head. The tail is smaller in diameter than the cupped inside of the head.

Preferably the head is a hollow spherical shape having an opening in one side. The head is made of a resiliently deformable material so that the head will deform to pass through areas of reduced internal diameter in the pipeline and the head will resiliently return to its undeformed shape after passing through areas of reduced internal diameter in the pipeline.

A first fastener is provided on the outside of the head for fastening objects to the outside of the head and a second fastener is provided at the second end of the tail for fastening objects to the second end of the tail.

The length of the tail is preselected so that the outside of the head remains in contact with the walls of the pipe as the second end of the tail is moved laterally from wall to wall within the pipeline. Preferably, the length of the tail is more than about 1.5 times the largest internal diameter of the pipeline.

It is an advantage of the present invention to provide a pipeline pig which will exit an elbow or tee properly aligned and oriented.

It is an advantage of the present invention to allow the connection of pipeline pigs end-to-end.

It is an advantage of the present invention to allow the attachment and replacement of various pipeline servicing equipment such as brushes, scrapers, discs, cups, electronic measuring equipment, etc. to a pipeline pig.

BRIEF DESCRIPTION OF THE DRAWINGS

The present invention will be better understood by reference to the example of the following drawings:

FIG. 1 is a side view of an embodiment of the pipeline pig of the present invention in a pipeline.

FIG. 2 is a sectional side view of another embodiment of the pipeline pig of the present invention negotiating a restriction in a pipeline.

FIG. 3 is a sectional side view of another embodiment of the pipeline pig of the present invention.

FIG. 4 is a sectional side view of another embodiment of the pipeline pig of the present invention adapted for passage through a pipeline made of pipes of different diameters.

FIG. 5 is a sectional side view of another embodiment of the pipeline pig of the present invention negotiating an elbow in a pipeline.

FIG. 6 is a sectional side view of an embodiment of a wear pad for the present invention.

FIG. 7 is a sectional side view of an embodiment of the pipeline pig of the present invention negotiating a tee in a pipeline.

DETAILED DESCRIPTION OF THE PREFERRED EMBODIMENTS

Before explaining the present invention in detail, it is intended to be understood that the invention is not limited to the details of construction, arrangements of parts, and methods described and illustrated herein, since the invention is capable of other embodiments and of being practiced or carried out in various ways commensurate with the attached claims. Also, it is intended to be understood that the phraseology or terminology employed herein is for the purpose of description and not of limitation.

FIGS. 1-7 present embodiments of the pipeline pig, generally designated 20, of the present invention. To facilitate description and understanding, the apparatus and method of the present invention are described herein in conjunction with a pipeline. It is intended to be understood that the invention may be used with virtually any type of fluid conducting conduit or tubing.

Referring to the example of FIG. 1, the pig 20 of the present invention may be generally described as comprising a head 22 and an elongate tail 24. The head has an outside 26 and a cupped inside 28. The elongate tail 24 has a first end 30 connected to the cupped inside 28 of the head 22 and a second end 32 extending out of the cupped inside 28 of the head 22. The tail 24 is of smaller diameter than the cupped inside 28 of the head 22 to allow fluid pressure within the pipeline 34 to act against the inside 28 and propel the pig 20 through the conduit or pipeline 34.

Referring to the example of FIG. 1, in a preferred embodiment, the entire head 22 is cupped or generally arcuate and has an inside 28 for facing upstream in the pipeline 34 and receiving fluid flow in the pipeline. At least a portion of the outside 26 faces downstream and at least a portion of the outside contacts the inside walls 36 of the pipeline 34, i.e., the outside 26 of the head 22 includes a contact area 42 for contacting the inside walls 36 of the pipeline 34. The length of the tail 24 is preselected so that the contact area 42 of the head 22 remains in contact with the inside walls 36 of the pipeline 34 as the second end 32 of the tail 24 is moved laterally from wall to wall within the pipeline 34. In other words, the tail 24 keeps the outside 26 of the head 22 in contact with the inside wall 36 of the pipeline 34. The tail 24 maintains the orientation and alignment of the head 22 in the pipeline 34 by limiting the freedom of the head 22 to rotate, as will be discussed further below.

Preferably, the head 22 is made of a resilient material, such as polymer, plastic, rubber, etc., so that the pressure of fluid flow against the inside 28 of the head 22 forces the outside 26 of the head 22 into contact with the inside walls 36 of the pipeline 34. The head 22 is made of a resiliently deformable material so that the head 22 will deform to pass through areas of reduced internal diameter in the pipeline 34 and the head 22 will resiliently return to its undeformed shape after passing through the areas of reduced internal diameter, as exemplified in FIG. 2. The head 22 does not have to be soft, as is a foam pig, but only resilient enough to deform, as described above, and to expand at the pressure drop across the pig 20. That is, the difference between the upstream pressure on the inside 28 of the head 22 and the downstream pressure present on the outside 26 of the head 22 should expand the head 22 into contact with the inside walls 36 of the pipeline 34. The diameter and material of the head 22 should be selected so that the desired amount of sealing is created between the outside 26 or contact area 42 of the head 22 and the inside wall 36 of the pipeline 34. It is sometimes desirable to allow some of the upstream fluid to bypass or blow by the pig 20 in order to prevent build up of material downstream of the pig 20, to reduce the possibility of gas or liquid pockets forming in the pipeline 34, as well as to prevent other problems. At other times it is desirable that the head 22 have a tight seal against the pipeline wall 36, in which case a softer material or larger diameter may be selected for the head 22.

The head 22 may be generally cylindrical in shape with the downstream end of the cylinder closed and the upstream end of the cylinder open (not illustrated) and may take other shapes to which the tail 24 may be attached and which have a diameter approximately equal to the diameter of the pipeline 34 and a contact area which will remain in contact with the pipeline walls 36 as the tail 24 moves laterally. In the preferred embodiment, referring to the example of FIG. 1, the head 22 is a hollow spherical shape having an opening 44 in one side. The tail 24 is of smaller diameter than the opening 44 to allow fluid to propel the pig 20, as discussed above. Preferably, the spherical head 22 has an outside diameter about equal to the largest internal diameter of the pipeline 34. The diameter of the head 22 should be carefully selected. If the diameter of the head 22 is too large it will create excess friction with the inside wall 36 of the pipeline 34 which will result in excessive wear and deterioration of the head 22. Conversely, if the diameter of the head 22 is too small the pig 20 will not be properly propelled through the pipeline 34.

The opening 44 should be small enough to allow some rotation of the head 22 in the pipeline 34 without the edge of the opening 44 contacting the pipeline wall 36. The opening 44 should be large enough to ensure good communication of the fluid pressure in the pipeline upstream of the pig 20 into the inside 28 of the head 22. Preferably, the edges of the opening define a 75° angle with the center of the spherical head 22, i.e., the opening 44 defines an arc of approximately 75° on the surface of the spherical head 22.

Bypass holes 46, best seen in FIG. 2, may be provided through the head 22. The bypass holes 46 allow some fluid flow through the head in order to promote thorough mixing of the fluids in the pipeline. The bypass holes 46 are helpful in preventing buildup of solid material in front of the head 22 and between tandem heads 22 as well as in reducing the formation of gas or liquid pockets in the pipeline 34. If solid materials are allowed to build up in front of the head 22 the pig 20 may become stuck and plug the pipeline 34.

As previously mentioned, the length of the tail 24 should be selected to keep the outside 26 of the head 22, i.e., the contact area 42, in contact with the inside walls 36 and to prevent the opening 44 from contacting the walls 36. In order to accomplish this, the length of the tail 24 should be at least equal to the largest internal diameter of the pipeline 34, and when the head 22 is spherical the length of the tail 24 should be greater than about 1.5 times the largest internal diameter of the pipeline 34. Stated another way, when the head 22 is spherically shaped, the distance from the second end 32 of the tail 24 to the center of the spherical head 22 should be at least equal to the largest internal diameter of the pipeline 34. In the preferred embodiment, referring to the example of FIG. 1, the length of the tail 24 is approximately two times the larges internal diameter of the pipeline 34 so that the portion of the tail extending outside the spherical area of the head 22 is at least one pipe diameter in length. The tail 24 may have any diameter, although the tail 24 must leave sufficient area of the inside 28 exposed to the upstream fluid pressure that the fluid pressure will propel the pig 20 under the fluid conditions, i.e., pressure, flow, fluid state, etc., present in the pipeline.

Referring to the example of FIG. 3, in a preferred embodiment, the pig 20 includes a first fastener 50 on the outside 26 of the head 22 for fastening objects to the outside 26 of the head 22 and a second fastener 52 connected to the second end 32 of the tail 24 for fastening objects to the second end 32 of the tail 24. Preferably, the first and second fasteners 50, 52 are mating fasteners 50, 52 so that a plurality of pigs 20 may be concatenated first fastener 50 to second fastener 52, i.e., a plurality of pigs 20 may be connected together end-to-end. A tensile member 54 having a first end 56 connected to the first fastener 50 and a second end 58 connected to the second fastener 52 may be provided to provide greater tensile strength between the fasteners 50, 52 and in the pig 20. As illustrated in FIG. 3, in the preferred embodiment, the tensile member 54 extends through the length of the tail 24. The tensile member 54 may be made of any material and shape which will withstand the anticipated tensile forces in the pig 20. Preferably, the tensile member 24 is a steel cable. The tail 24 is preferably made of the same material as head 22. The tail 24 should be sufficiently stiff to retain its shape as the pig 20 passes through elbows, tees, and fittings and to retain its shape under compressive forces which may be exerted on the tail 24 if a second head 22 is attached to the second fastener 52, as exemplified in FIGS. 2 and 4.

The first fastener 50 should normally be positioned at the apex of the outside 26 of the cupped head 22, i.e., the first fastener 50 should be positioned at the apex of the portion of the outside 26 of the head 22 which is normally oriented downstream in the pipeline 34. As illustrated in FIG. 3, the first fastener 50 should be inset into the outside 26 of the head 22 to prevent metal-to-metal contact between the first fastener 50 and the inside wall 36 of the pipeline 34. In the preferred embodiment, referring to the example of FIG. 3, the first fastener 50 is a female nut, also designated 50, and the second fastener 52 is a threaded stud, also designated 52, which will mate with the female nut 50. The tensile member 54, which is preferably a steel cable, is fastened directly to the female nut 50 and stud 52 by swageing or equivalent fastening.

The first and second fasteners 50, 52 may be used in several ways. An eye bolt (not illustrated) may be connected to the first fastener 50 for pulling the pig 20 out of the pipeline 34. The fasteners 50, 52 may be used to connect two or more pigs in tandem, or end-to-end, as illustrated in FIG. 4. Brushes 64, best seen in FIG. 5, may be attached to the first and/or second fasteners 50, 52 for cleaning the inside wall 36 of the pipeline 34. A scraper 66 (exemplified in FIG. 4) may be attached to the first and/or second fasteners 50, 52 for removing wax and other build up from the inside wall 36 of the pipeline 34. A metal sizing disc (not illustrated) may be connected to the first and/or second fasteners 50, 52 for determining if buckles or dents exist in the pipeline 34. Similarly, discs, cups, and spheres for scraping the pipeline wall 36 or for extra sealing may be provided; and extra length may be added to the tail 24 to faciliate passage of the pig 20 through check valves, tees, bypass-type fittings, etc. Also, the first and/or second fastener 50, 52 may be used to attach electronic distance measuring devices, electronic measuring equipment, and other electronic equipment to the pig 20. The fasteners 50, 52 allow the pig 20 to be used as a vehicle for transporting equipment through the pipeline 34.

If the pig 20 is to be used without a second head 22 or another pig 20 attached to the second end 32 of the tail 24, a wear pad 68 should be attached to the second end 32 of the tail 24. The wear pad 68 may be an integral, formed part of the second end 32 of the tail 34, as exemplified in FIG. 1, or may be attached to the second fastener 52, as exemplified in FIG. 6. Preferably, the wear pad 68 is made of the same material as the tail 24 and is used to prevent the second end 32 of the tail 24 from wearing out due to abrasion with the inside walls 36 of the pipeline 34. When used with a tail 24 having a second fastener 52, the wear pad 68 may be fastened to the stud of the second fastener 52 using a nut 70 with a washer 72, 74 on either side of the wear pad or an equivalent fastening. The preferred wear pad 68 has a recess 76 in which the second fastener 52 is recessed in order to prevent metal-to-metal contact between the second fastener 52 and the pipeline wall 36.

The pig 20 will pass through tees and elbows (90° bends) in the pipeline 34 including long radius welded elbows, short radius welded elbows, and perpendicular or 90° elbows such as screwed elbows. Referring to the example of FIG. 7, first the head 22 passes into the tee (or other bend) and as the fluid flow tries to push the head 22 sideways on the downstream side of the tee, the tail 24 contacts the inside wall 34 and guides the head 22 to properly align and orient the head 22 in the downstream side of the tee. One of the advantages of the pig 20 over the use of spheres and foam pigs is that the pig 20 will exit an elbow or tee properly aligned. Traditional metal pigs will not normally pass through a tee or elbow. A foam pig will normally exit an elbow sideways, i.e., turned 90° from its proper orientation or balled up. The tail 24 of the pig 20 keeps the head 22 from rolling in the pipeline 34 and keeps the head 22 properly aligned and oriented with the contact areas 42 adjacent the pipeline inside walls 34. Proper alignment and orientation are necessary to keep the upstream pressure acting against the inside 28 of the head 22. FIG. 5 illustrates the pig 20 negotiating an elbow in a pipeline 34.

In addition to negotiating tees, elbows, and other pipe fittings, the pig 20 will pass through restrictions such as plug valves, venturi valves, pipeline dents, and pipeline buckles, as exemplified in FIG. 2. The head 22 should be resilient enough to compress into whatever shape is required to go through a restriction and to return to its original shape after passing through the restriction. If the pig 20 is to pass through restrictions 80, such as valves, or through areas where the pig 20 loses contact with a portion of the pipeline wall 36, such as where another pipeline tees into the side of the pipeline 34 through which the pig 20 is passing, a second head 22 should be connected to the second fastener 52 and the tail 24 should be lengthed to a length greater than the restriction or open area so that the pig 20 will bridge the restriction or open area and one of the heads 22 will be in full contact with the pipeline inside wall 36 at all times. The second head 22, as illustrated in FIGS. 2 and 4, is necessary to prevent the pig 20 from getting stuck in restrictions or open areas.

Referring to the example of FIG. 4, the pig 20 may be used for pigging a pipeline 34 which has pipes of different diameters by placing heads 22 of different diameters on one pig 20. Each of the heads 22 should be individually selected and sized to fit one of the different diameters present in the pipline 34.

Thus, the present invention provides a novel and improved pipeline pig 20 having a resilient, deformable head 22 and an elongate tail 24. The improved pig 20 provides directional and orientational control of the head 22 and of the sealing of the head 22 with the pipeline inside walls 36 as the pig 20 travels around bends and through restrictions and fittings in the pipeline 34.

While presently preferred embodiments of the invention have been described herein for the purpose of disclosure, numerous changes in the construction and arrangement of parts and the performance of steps will suggest themselves to those skilled in the art, which changes are encompassed within the spirit of this invention as defined by the following claims.

What is claimed is:

1. A pig which may be propelled by fluid flow through a conduit, such as a pipeline, comprising:

a cupped head having an inside for facing upstream and receiving fluid flow in the pipeline and an outside for facing downstream and for contacting the inside walls of the pipeline, the outside of the head having a contact area for contacting the inside walls of the pipeline;

an elongate tail having a first end connected to the cupped inside of the head and a second end extending out of the inside of the head, the tail and the second end of the tail being of smaller diameter than the inside of the head so that the second end of the tail is free to move laterally in the pipeline, the length of the tail being preselected so that the contact area of the head remains in contact with the walls of the pipeline as the second end of the tail is moved laterally from wall to wall within the pipeline;

a first fastener connected to the outside of the head for fastening objects to the outside of the head;

a second fastener connected to the second end of the tail for fastening objects to the second end of the tail; and a tensile member having a first end connected to the first fastener and a second end connected to the second fastener.

2. The pig of claim 1:
wherein the head is made of a resilient material so that the pressure of fluid flow against the inside of the head forces the outside of the head into contact with the inside walls of the pipeline.

3. The pig of claim 1:
wherein the head is a hollow spherical shape having an opening in one side; and
wherein the tail is of smaller diameter than the opening.

4. The pig of claim 3:
wherein the spherical head has an outside diameter about equal to the largest internal diameter of the pipeline; and
wherein the length of the tail is greater than about 1.5 times the largest internal diameter of the pipeline.

5. The pig of claim 4:
wherein the head is made of a resiliently deformable material so that the head will deform to pass through areas of reduced internal diameter in the pipeline and the head will resiliently return to its undeformed shape after passing through the areas of reduced internal diameter.

6. The pig of claim 1, comprising:
a pipeline wall cleaning device detachably connected to the second fastener.

7. The pig of claim 1:
wherein the first and second fasteners are mating fasteners so that a plurality of the pigs may be concatenated first fastener to second fastener.

8. A pig which may be propelled by fluid flow through a conduit, such as a pipeline, comprising:

a truncated hollow spherical head having an opening to an inside for facing upstream and receiving fluid flow in the pipeline, the head having an outside for facing downstream and for contacting the inside walls of the pipeline;

an elongate tail having a first end connected to the inside of the head and a second end extending out of the opening, the tail and the second end of the tail being of smaller diameter than the opening so that the second end of the tail is free to move laterally in the pipeline;

a first fastener connected to the outside of the head for fastening objects to the outside of the head;

a second fastener connected to the second end of the tail for fastening objects to the second end of the tail; and a tensile member having a first end connected to the first fastener and a second end connected to the second fastener.

9. The pig of claim 8:
wherein the head is made of a resilient material so that the pressure of fluid flow against the inside of the head forces the outside of the head into contact with the inside walls of the pipeline.

10. The pig of claim 9 in which the outside of the head comprises:
a contact area for contacting the inside walls of the pipeline; and
wherein the length of the tail is preselected so that the contact area of the head remains in contact with the walls of the pipeline as the second end of the tail is moved laterally from wall to wall within the pipeline.

11. The pig of claim 8:
wherein the spherical head has an outside diameter about equal to the largest internal diameter of the pipeline; and
wherein the length of the tail is greater than about 1.5 times the largest internal diameter of the pipeline.

12. The pig of claim 11:
wherein the head is made of a resiliently deformable material so that the head will deform to pass through areas of reduced internal diameter in the pipeline and the head will resiliently return to its undeformed shape after passing through the areas of reduced internal diameter.

13. The pig of claim 8, comprising:
a pipeline wall cleaning device detachably connected to the second fastener.

14. The pig of claim 8:
wherein the first and second fasteners are mating fasteners so that a plurality of the pigs may be concatenated first fastener to second fastener.

* * * * *